Figure 1:
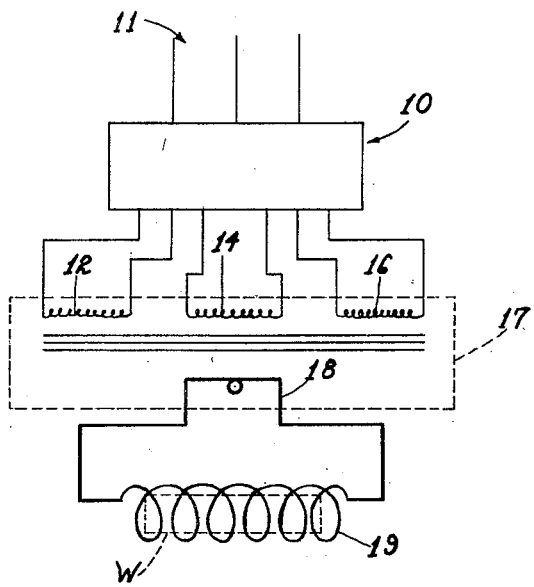

Dec. 3, 1957 J. F. DEFFENBAUGH 2,815,425
INDUCTION HEATING
Filed Oct. 27, 1955

INVENTOR.
JAMES F. DEFFENBAUGH
BY
Michael Williams
ATTORNEY

United States Patent Office 2,815,425
Patented Dec. 3, 1957

2,815,425

INDUCTION HEATING

James F. Deffenbaugh, Warren, Ohio, assignor to The Federal Machine and Welder Company, Warren, Ohio, a corporation of Ohio Application October 27, 1955, Serial No. 543,206

3 Claims. (Cl. 219—10.41)

My invention relates to means for and methods of heating metals by use of electromagnetic energy, generally known as induction heating, and the principal object of my invention is to provide new and improved means of this character.

In the heating of metals, it is frequently necessary to obtain a uniform temperature throughout the metal body. For example, in the heating of billets of ferrous or non-ferrous material, it is very desirable to heat the entire body to a uniform temperature in order to facilitate subsequent operations, such as forging or extruding of the billet.

It is well-known that the depth of penetration of electrical currents induced in a billet, and which currents develop heat energy in the billet, vary inversely as the frequency. Thus, induction heating of thick parts, or billets of substantial cross section, has been done at power line frequency, rather than at some higher frequency, in order to facilitate penetration of heat into the billet.

However, even at power line frequency, the depth of heat penetration is limited. For example, in the case of a solid cylinder of about six inches in diameter, which is representative of usual billet size, the depth of current penetration is only about .060 centimeters for iron and about 1.07 centimeters for aluminum at frequencies of 60 cycles per second. It will thus be appreciated that all of the energy available to heat the billet is confined to a narrow band around the outer circumference of the billet.

The foregoing type of induction heating has serious disadvantages. For example, the time required for the entire billet to reach a desired temperature is relatively long since the heat energy must travel from the circumference of the billet to the center thereof. Accordingly, when the central part of the billet reaches a predetermined temperature, the circumferential portion of the billet may have reached an undesirably high temperature. Particularly in the case of aluminum, which has a narrow plastic range, the surface of the billet may become plastic before the central portion thereof reaches a desired temperature.

Since the heating of metal parts of relatively large mass requires considerable energy and since modern shop practice requires production at as great a rate as possible, the electrical power required is great enough to justify careful consideration of the losses involved in order to reduce the load on the electric supply system.

As the transfer of electromagnetic energy requires a coil having an inherent inductance, part of the energy required is wattless and lowers the power factor of the apparatus. Since this loss is proportional to the reactance of the system which is in turn proportional to the frequency of the apparatus, it follows that a reduction in frequency will produce a reduction in the reactive loss and, therefore, an increase in efficiency. At commercial power line frequencies, the reactive losses are appreciable and shunt capacitors are sometimes required in order to increase the operating power factor.

The large energy and power requirements also make it desirable to operate induction heating apparatus from a three phase source. This is usually done by providing three single-phase transformers connected in either delta or star, or two transformers and a Scott connection. In either case, the secondary voltages are not in phase and this results in complications when energizing the induction coil. Such complications arise mainly because the coil must be made in either three or two sections if full secondary voltage is to be impressed on the coil. If a one section coil is used, the total effective voltage will be the vector sum of the transformer secondary voltage and will be less than the arithmetic sum. This, also, results in an unbalanced three-phase load.

My invention enables use of either a single, two or three phase power source and provides efficient apparatus which overcomes the disadvantages of the prior art.

Figure 2:
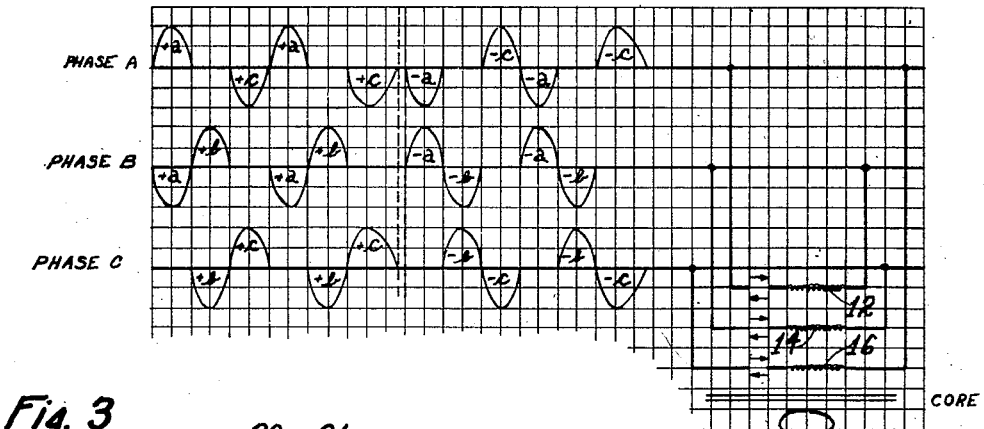
Figure 3:
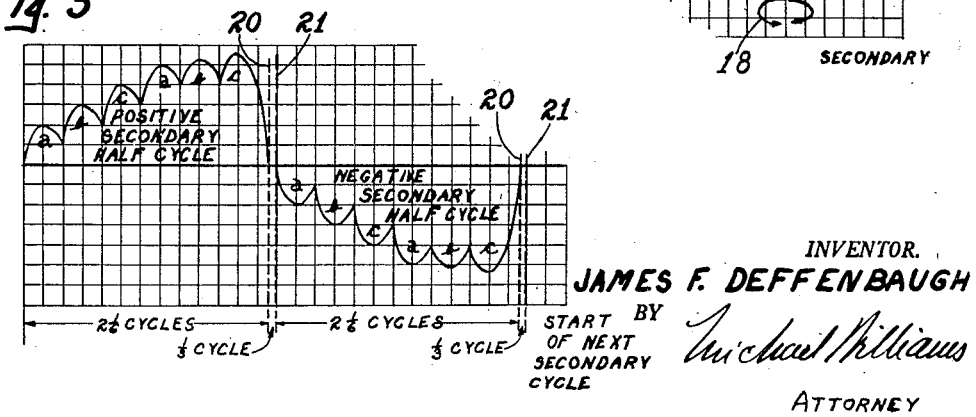

In the drawing accompanying this description and forming a part of this application, there is shown, for purpose of illustration, an embodiment which my invention may assume, and in this drawing:

Figure 1 is a diagrammatic view showing electrical connection of my improved apparatus, Figure 2 is a chart showing wave formation of the current flowing as a result of my improved apparatus, and Figure 3 is a chart showing the combination of the waves shown in Figure 2, and made possible by my improved apparatus.

My invention generally comprises a timing control and contactor unit and one transformer preferably having three primary windings and one secondary winding, the latter being electrically connected to an induction heating coil.

Referring particularly to Figure 1 of the drawings, the timing control and contactor unit 10 may be of any commercially available type such as is used for the purpose of changing frequencies in a resistance welder apparatus. Companies such as General Electric, Westinghouse, and others, provide units of this type for electric resistance welding and since such units, per se, do not form part of this invention, detailed description thereof is believed unnecessary.

The timing control and contactor unit 10 may be connected to a single phase, two phase or three phase power source and, in the present embodiment, the unit 10 is shown connected to a three phase power source 11 at, for example, 50 or 60 cycle frequency.

The unit 10 has proper electrical connection to three primary coils 12, 14 and 16 of a transformer 17. The single secondary coil 18 of the transformer is connected in series relationship with an induction heating coil 19 within which the work W, such as a metallic billet, may be selectively positioned.

The unit 10 has such operating characteristics as to allow one-half cycle of current of one polarity to successively flow through each of the three primary coils. This successive flow may be repeated as many times as is desired, merely by proper setting of the controls of the unit 10, to produce a secondary current of one polarity which exists as long as voltage is impressed on the successive primary windings.

The unit 10 may then automatically interrupt voltage of the one polarity and allow voltage of the opposite polarity to be successively impressed on the three primary coils, preferably for the same length of time as for the first polarity sequence.

The flow of secondary currents induced by the foregoing successive energization of the three primary coils, first of one polarity and then the other, are of a frequency lower than the supply line frequency. It will be appreciated that the secondary frequencies may be varied by varying the number of times voltage of one and the other polarity is impressed successively on the primary coils 12, 14 and 16.

Thus, by varying the secondary frequencies, particularly below the frequency of the power source, the effective depth of current penetration in the work W may be increased to a practical dimension.

The unit 10 may be either manually or automatically controlled to change the number of times voltage of the opposite polarities is alternately impressed on the successive primary coils 12, 14 and 16 so that the effective depth of current penetration may be changed during the heating cycle, and without interrupting the heating cycle, merely by changing the frequency of the secondary voltage.

Since the secondary frequency is reduced, it will be appreciated that the reactive losses will be reduced. Further, since the load is three phase it is substantially balanced. It will be apparent that my invention requires only one transformer and since only one secondary voltage is produced the coil construction is simplified.

As seen in Figure 2, phases A, B and C indicate the peak value of primary current in the coils 12, 14 and 16 during operation of my improved apparatus. In the particular case illustrated, voltage of one polarity is twice successively impressed on the coils 12, 14 and 16, is then interrupted at the place indicated by the dotted line 20, and voltage of the opposite polarity is then twice successively impressed on the coils 12, 14 and 16. This may be automatically repeated as often as is desired.

As seen in Figure 2, impression of voltage of positive polarity on successive phases A, B and C will establish successive positive peaks *a*, *b* and *c*. Since the power source in this instance is three phase, peak *c* will also be formed in phase A; peak *a* in phase B; and peak *b* in phase C. For any one sequence there is then an equal number of half cycles of opposite polarity in each phase. The result is an essentially balanced three-phase load.

The positive peaks *a*, *b*, *c* and *a*, *b*, *c* caused by twice impressing voltage of positive polarity on successive primary coils 12, 14 and 16 cause a secondary half cycle of positive polarity as shown in Figure 3. When voltage of positive polarity is interrupted, as at the line 20 and voltage of negative polarity (starting, for example, at the line 21) is thereafter impressed on the primary coils in the manner and for the same duration as the voltage of positive polarity, the peaks will appear as shown in Figures 2 and 3.

Assuming, for example, that the positive and negative secondary cycles, as shown in Figure 3, are each two and one-sixth cycles in duration, and the dwell between impression of positive and negative polarity is one-third cycle in duration, a total of five cycles is consumed in one positive secondary half cycle and one negative secondary half cycle.

Assuming that the power source is at sixty cycles, the frequency of the secondary shown in Figure 3 will be twelve cycles per second, a considerable reduction with respect to the frequency of the power source. It will be appreciated that the secondary frequency may be varied merely by adjustment of the controls of the unit 10.

By delaying the ignition time of the ignitron tubes, the R. M. S. value of the load current can be steplessly reduced from a maximum to twenty percent of maximum. This is easily accomplished by a method known as phase shift heat control, and is an integral part of the basic control.

It eliminates the necessity for interrupting the heating cycle to change the value of the load current or voltage as has to be done when the adjustment is made by changing the transformer turn ratio.

The adjustment may also be made automatically if it is necessary to vary the heating cycle during the operation of the device. This is desirable in some cases when billets enter or leave the coil.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Induction heating apparatus for increasing penetration of the heating currents in a work piece, comprising a timing control and contactor unit connectable to a source of power and controlling flow of current from said source, a transformer having a plurality of primary windings and a single secondary winding, and an induction heating coil electrically connected to said secondary winding and adapted to establish electromagnetic enregy in said work piece to heat the same, said primary windings being independently connected to said control unit and the latter being constructed and arranged to selectively impress voltage of one or the other polarities successively on said primary windings to induce flow of current in said single secondary winding of opposite half cycles respectively equal to the cumulated half cycles of respective voltage polarity impressed on said primary windings.

2. The method of reducing current frequency from a source to an induction heating coil to increase the depth of heating penetration in a work piece to be heated, which comprises impressing half cycles of a source voltage of one polarity and then the other successively on a plurality of primary windings of a transformer having a single secondary winding electrically connected to said induction heating coil.

3. The method of increasing penetration of the heating currents in an induction heating coil, which comprises electrically connecting said heating coil in series with the single secondary of a transformer having a plurality of primary windings, successively impressing voltage of one polarity on said primary windings to produce a half cycle of heating current in said secondary coil corresponding in duration to the duration of impression of voltage of said one polarity, and thereafter impressing voltage of the opposite polarity successively on said primary windings to produce the opposite half cycle of heating current in said secondary coil corresponding in duration to the duration of impression of voltage of said opposite polarity.

References Cited in the file of this patent

UNITED STATES PATENTS

| | | |
|---|---|---|
| 1,926,811 | Long | Sept. 12, 1933 |
| 2,400,472 | Strickland | May 14, 1946 |
| 2,676,232 | Dreyfus | Apr. 20, 1954 |

FOREIGN PATENTS

| | | |
|---|---|---|
| 512,738 | Great Britain | Sept. 25, 1939 |